N. GERSON.
BICYCLE SADDLE.
APPLICATION FILED JULY 14, 1916.
1,209,141.
Patented Dec. 19, 1916.
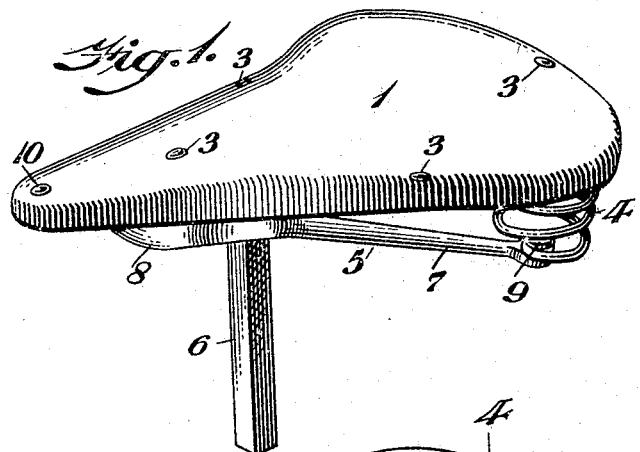
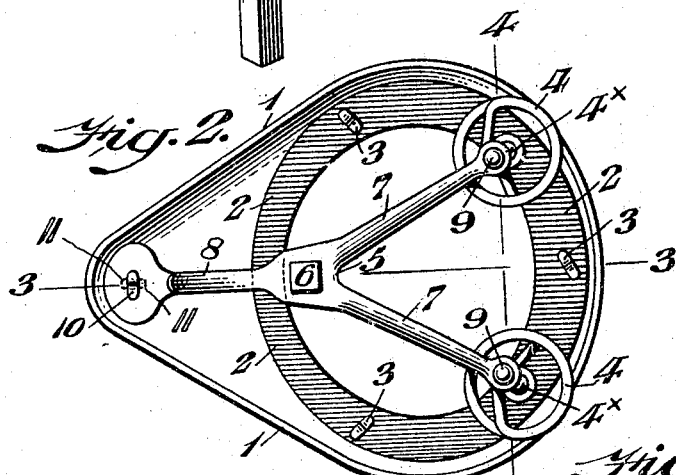
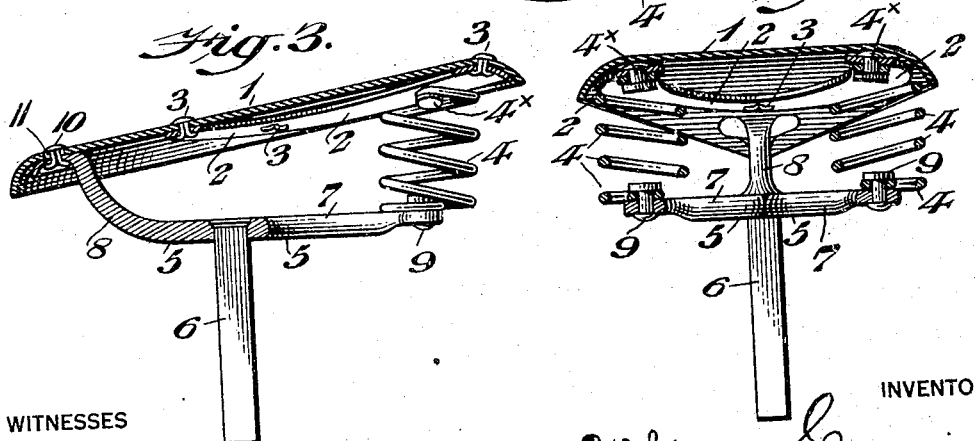
WITNESSES
INVENTOR
Nikolaus Gerson.
BY Wiedersheim + Fairbanks
ATTORNEYS

UNITED STATES PATENT OFFICE.

NIKOLAUS GERSON, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

BICYCLE-SADDLE.

1,209,141.  Specification of Letters Patent.  Patented Dec. 19, 1916.

Application filed July 14, 1916. Serial No. 109,243.

*To all whom it may concern:*

Be it known that I, NIKOLAUS GERSON, a subject of the Emperor of Austria-Hungary, residing in the city and county of Philadelphia, State of Pennsylvania, have invented a new and useful Bicycle-Saddle, of which the following is a specification.

My invention consists of improvements in a saddle for a bicycle or like article as will be hereinafter described and pointed out in the claims.

The invention is satisfactorily illustrated in the accompanying drawing, but the important instrumentalities thereof may be varied, and so it is to be understood that the invention is not limited to the specific details shown and described.

Figure 1 represents a perspective view of a saddle embodying my invention. Fig. 2 represents a bottom plan view thereof. Fig. 3 represents a longitudinal section on line 3—3 Fig. 2. Fig. 4 represents a transverse section on line 4—4 Fig. 2.

Similar numerals of reference indicate corresponding parts in the figures.

Referring to the drawings, 1 designates a bicycle saddle or seat proper which is formed of substantially rigid material preferably of what is known as vulcanized fiber properly shaped, it being pliable and resilient in its nature, but to which material I do not limit my invention. On the underside of said saddle is the annular shaped plate or band 2 which is formed of metal or other suitable rigid material, secured firmly to the plate by rivets 3, which are passed through the seat and clenched on said plate.

4 designates coil or other shaped springs which depend from the underside of the rear portion of the saddle on opposite sides thereof and have their upper convolutions secured firmly to the plate 2 by the rivets 4$^x$, or other suitable means passed through eyes on the ends of said convolutions.

5 designates a spider or spider-like frame which occupies a position on the underside of the saddle 1 and has depending therefrom from between its ends the saddle post 6. The spider consists of the limbs 7 and 8, the limbs 7 diverging or spreading rearwardly from the place of connection of the post 6 and having their rear terminals disconnected from the seat but connected firmly with the lower convolutions of the springs 4 by the rivets 9 or other suitable means passed through eyes on the ends of said convolutions. The limb 8 extends forwardly from the place of connection of the post 6 and has its front terminal connected with the adjacent portion of the saddle 1 by the rivet 10.

It will now be seen that by the above embodiment of my invention the saddle though of substantially rigid material strengthened by the band or ring 2 of rigid material on the underside thereof is of a pliable and resilient nature, and as its rear is cushioned by said intermediate band or ring on the springs 4—4 it possesses increased resiliency so that when it is occupied it yields gradually with a downward leverage from the front of the spider to said springs, providing a comfortable and easy seat for the rider, and preventing severe shocks being imparted to the same. The spider is light, strong and durable in its nature, and owing to the divergence of the limbs 7 of said spider, the springs 4 are spread to the sides of the saddle and connected with the adjacent portions of said reinforcing band or ring 2 serving to directly support the saddle at said sides, balancing the saddle by said band or ring around what may be termed the underside of the rim of the main portion thereof, and allowing said portion about the center thereof to be free of support from below, whereby said portion is adapted to yield when the weight of the rider is thereon. Furthermore, while the band 2 is pliable and yielding in its nature, it serves also as a reinforce for the main seating portion of the saddle from below, its annular or open nature allowing said portion to yield uncontrolled when the saddle is occupied, as said portion is not resisted by said band, nor in any respect by the spider beneath the same, said spider being connected by its front limb 8 in a direct manner with the front or horn of the seat which limb has thereon a comparatively flat plate, which as shown in Fig. 4, forms an extensive broad support for said horn on said limb 8 and is located within the depending side rim of the horn preventing also side turning of the latter, this being assisted by the connecting rivet 10 which is secured to said plate 8 and horn.

Attention is directed to the fact that the shank of the rivet 10 occupies the elongated slot 11 in the front end or horn of the seat or saddle, so that while said rivet connects the seat or saddle with the spider as has been stated, it allows when the seat is occupied and in use, a certain play or slide of said front of the seat on said shank, so that the resiliency of the seat on the limb 8 of the spider is preserved to a greater extent than if said seat had a rigid connection with said limb.

Having thus described my invention what I claim as new and desire to secure by Letters Patent, is:—

1. In a saddle, a seat, a reinforcing ring of rigid material on the underside of the body of the seat secured thereto, a spider under said seat, springs connected with the rear portions of said ring and depending therefrom and with the terminals of the rear limbs of said spider, the forward portion of said spider being connected with the horn of said seat, the opening in said ring providing for the resiliency of said body of the seat thereover.

2. In a saddle, a seat of substantially rigid material, a reinforcing member of rigid material on the under side of the seating portion of the body of said seat secured thereto, a spider beneath said seat, and springs secured respectively to the rear portions of said ring and depending therefrom and the terminals of the rear limbs of said spider and supported on said limbs, the horn of the seat being supported slidingly on the front limb of said spider and secured movably thereto.

3. In a saddle, a seat, a reinforcing member on the under side of the seating portion of the body of said seat secured thereto, a spider beneath said seat, and springs secured respectively to the rear portions of said member and depending therefrom and the terminals of the rear limbs of said spider and supported on said limbs, the horn of the seat extending over the front limb of said spider and secured movably thereto, the front limb of said spider having thereon a horizontally-extending plate on which said horn is supported directly.

4. In a saddle, a seat, a reinforcing member on the underside of the seating portion of the body of said seat secured thereto, a spider beneath said seat, and springs secured respectively to the rear portions of said member and depending therefrom and the terminals of the rear limbs of said spider and supported on said limbs, the horn of the seat extending over the front limb of said spider and being secured movably thereto, the front limb of said spider having thereon a horizontally-extending plate on which said horn is supported and to which it is secured movably, said horn having therein a longitudinally-extending slot in which is received freely the member which secures said horn to said plate.

NIKOLAUS GERSON.

Witnesses:
JOHN A. WIEDERSHEIM,
N. BUSSINGER.

Copies of this patent may be obtained for five cents each, by addressing the "Commissioner of Patents, Washington, D. C."